US011940329B2

(12) United States Patent
Marchant

(10) Patent No.: US 11,940,329 B2
(45) Date of Patent: Mar. 26, 2024

(54) VOICE COILS FOR USE WITH TEMPERATURE SENSORS AND DEVICES INCLUDING THE SAME

(71) Applicant: Google LLC, Mountain View, CA (US)

(72) Inventor: James Marchant, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 19 days.

(21) Appl. No.: 17/275,338

(22) PCT Filed: Apr. 24, 2020

(86) PCT No.: PCT/US2020/029684
§ 371 (c)(1),
(2) Date: Mar. 11, 2021

(87) PCT Pub. No.: WO2021/216076
PCT Pub. Date: Oct. 28, 2021

(65) Prior Publication Data

US 2023/0032222 A1 Feb. 2, 2023

(51) Int. Cl.

| | |
|---|---|
| ***G01K 1/02*** | (2021.01) |
| ***G01K 7/42*** | (2006.01) |
| ***H04R 3/00*** | (2006.01) |

(52) U.S. Cl.
CPC ............. *G01K 1/026* (2013.01); *G01K 7/427* (2013.01); *H04R 3/007* (2013.01)

(58) Field of Classification Search
None
See application file for complete search history.

(56) References Cited

U.S. PATENT DOCUMENTS

| | | | | |
|---|---|---|---|---|
| 4,130,725 | A | 12/1978 | Nagel | |
| 9,807,528 | B1 * | 10/2017 | Jensen | H04R 9/06 |
| 9,924,287 | B2 | 3/2018 | Macours et al. | |
| 2016/0105746 | A1 * | 4/2016 | Berthelsen | H04R 3/007 381/55 |
| 2017/0052341 | A1 | 2/2017 | Wong et al. | |

(Continued)

FOREIGN PATENT DOCUMENTS

| | | | |
|---|---|---|---|
| CN | 107734427 | A * | 2/2018 |
| DE | 212015000214 | U1 | 5/2017 |
| EP | 3121961 | | 1/2017 |

(Continued)

OTHER PUBLICATIONS

International Preliminary Report on Patentability in International Appln. No. PCT/US2020/029684, dated Nov. 3, 2022, 9 pages.

(Continued)

*Primary Examiner* — Mirellys Jagan
(74) *Attorney, Agent, or Firm* — Fish & Richardson P.C.

(57) ABSTRACT

A panel audio loudspeaker having a panel extends in a plane and an actuator is coupled to the panel. The actuator includes a voice coil attached to and extending from the panel along an axis, a magnet assembly suspended from the panel via one or more springs, and a temperature sensor in electrical contact with the coil at three different axial locations. The temperature sensor is configured, during operation of the device, to measure a temperature of the coil based on voltage measurements at the three different axial locations.

15 Claims, 6 Drawing Sheets

(56) References Cited

U.S. PATENT DOCUMENTS

| | | | |
|---|---|---|---|
| 2017/0223463 | A1 | 8/2017 | Salvatti et al. |
| 2019/0261092 | A1 | 8/2019 | Landick |

FOREIGN PATENT DOCUMENTS

| | | | | | |
|---|---|---|---|---|---|
| JP | 2010263332 | A | 11/2010 | | |
| JP | 2013077918 | A | 4/2013 | | |
| JP | 2018050330 | A | 3/2018 | | |
| TW | 201944788 | A | 11/2019 | | |
| WO | WO-0221879 | A2 * | 3/2002 | ............. | G01K 7/427 |
| WO | WO 2019/162659 | | 8/2019 | | |
| WO | WO 2019/172633 | | 9/2019 | | |
| WO | WO-2021183139 | A1 * | 9/2021 | ............. | H04R 1/028 |

OTHER PUBLICATIONS

Notice of Allowance in European Appln. No. 20725380.8, dated May 25, 2023, 9 pages.
Notice of Allowance in Japanese Appln. No. 2022-552268, dated Mar. 22, 2023, 5 pages (with English translation).
PCT International Search Report and Written Opinion in International Appln. No. PCT/US2020/029684, dated Jan. 11, 2021, 5 pages.

* cited by examiner

VOICE COILS FOR USE WITH TEMPERATURE SENSORS AND DEVICES INCLUDING THE SAME

CROSS-REFERENCE TO RELATED APPLICATION

This application is a National Stage Application under 35 U.S.C. § 371 and claims the benefit of International Application No. PCT/US2020/029684, filed Apr. 24, 2020. The disclosure of the foregoing application is hereby incorporated by reference in its entirety.

BACKGROUND

Conventional electromagnetic actuators operate by energizing an electrically-conducting coil (a "voice coil"), which induces a magnetic field that interacts with the magnetic fields of one or more magnets of the actuator. Not only does passing an electric current through the coil induce a magnetic field, it also causes the coil to heat up. For a device that includes an electromagnetic actuator, such as a mobile electronic device, components of the device that are connected to the coil of the actuator may be heated through their contact with the coil. Because certain components of an electronic device, e.g., electronic displays, can be sensitive to heat, the temperature of the coil, and the components to which it is attached, should be monitored and controlled.

For thermal monitoring, a conventional temperature sensor can be attached to the coil or to components to which the coil is attached. However, the weight and/or bulk of a conventional temperature sensor can impede operation of components to which the sensor is attached. Furthermore, manufacturers of many electronic devices generally aim to limit the power consumption of the electrical components of the devices and a conventional temperature sensor can consume more power than is desirable. Because of these limitations, it may be challenging to include a conventional temperature sensor in an electronic device that includes a voice coil actuator.

SUMMARY

A temperature sensor for a moving magnet actuator can feature several electrical terminals for voltage measurements across different lengths of the voice coil, and from the voltage measurements, the temperature of the coil and components attached to the coil can be determined. For example, in some embodiments, a voice coil includes three terminals, spaced at different axial locations along the coil. Two terminals are positioned at opposite ends of the coil, while a third terminal is positioned between the other two terminals. The three terminals can divide the coil into two portions of unequal lengths. A temperature sensor has connections to each of the three terminals, and the temperature sensor can measure the resistance across each of the two portions and across the entire length of the coil.

When the coil is energized by an electric current, the temperature of the coil increases. If the coil is attached to a panel, e.g., a panel of a panel audio loudspeaker, which can be an electronic display panel, then some of the heat of the coil will be transferred to the panel at the point of contact, causing a temperature gradient across the coil. Because the resistance across the coil increases when the coil's temperature increases, it is possible to deduce a temperature gradient along the length of the coil based on resistance measurements across the different lengths of the coil. A data processor of the temperature sensor is programmed to use the resistance measurements of the coil and the portions of the coil to deduce a change in the temperature of the panel. The temperature sensor can also be configured to deduce a change in temperature of one or more locations of the coil.

In general, in a first aspect, the disclosure features a device including a panel audio loudspeaker having a panel extending in a plane and an actuator coupled to the panel. The actuator includes a voice coil attached to and extending from the panel along an axis, a magnet assembly suspended from the panel via one or more springs, and a temperature sensor in electrical contact with the coil at three different axial locations. The temperature sensor is configured, during operation of the device, to measure a temperature of the coil based on voltage measurements at the three different axial locations.

Embodiments of the device can include one or more of the following features. For example, the panel can include an OLED display.

The three different axial locations can include a first location positioned at a first end of the voice coil attached to the panel, a second location positioned at a second end of the voice coil opposite the first end, and a third location positioned between the first and second locations. The temperature sensor can include one or more data processors programmed to measure the temperature of the coil by determining an electrical resistance of each of one or more portions of the voice coil based on the voltage measurements. The data processors can be further configured to generate a temperature measurement for each of three portions of the voice coil, the three portions of the voice coil including a first portion that extends from the first to the third location, a second portion that extends from the second to the third location, and a third portion that extends from the first to the second location. The one or more data processors can be further configured to correlate the electrical resistance of each of the one or more portions of the voice coil to a temperature measurement of a corresponding portion of the voice coil. The one or more data processors can be further configured to generate a temperature curve using the resistance measurements for each of the three portions of the voice coil. The one or more data processors can be further configured to estimate a temperature of the panel based on the temperature of the coil. The device can be configured to change one or more settings of the device based on the estimated temperature of the panel. The one or more settings can include a brightness of the display and a volume of audio output by the device.

In some embodiments, the third location is positioned closer to the first location than to the second location.

In general, in another aspect, the disclosure features a mobile device that includes an electronic display panel extending in a plane, a chassis attached to the electronic display panel and defining a space between a back panel of the chassis and the electronic display panel, an electronic control module housed in the space, the electronic control module including a processor, a panel audio loudspeaker including an actuator coupled to the display panel. The actuator includes a voice coil attached to and extending from the panel along an axis, a magnet assembly suspended from the panel via one or more springs, and a temperature sensor in electrical contact with the coil at three different axial locations, the temperature sensor being configured, during operation of the device, to measure a temperature of the coil based on voltage measurements at the three different axial locations. During operation of the actuator, the one or more springs flex to accommodate axial displacements of the magnet assembly relative to the voice coil.

In some embodiments, the mobile device is a smartphone or tablet computer.

In general, in a further aspect, the disclosure features a wearable device that includes an electronic display panel extending in a plane, a chassis attached to the electronic display panel and defining a space between a back panel of the chassis and the electronic display panel, an electronic control module housed in the space, the electronic control module including a processor, a panel audio loudspeaker including an actuator coupled to the display panel. The actuator includes a voice coil attached to and extending from the panel along an axis, a magnet assembly suspended from the panel via one or more springs, and a temperature sensor in electrical contact with the coil at three different axial locations, the temperature sensor being configured, during operation of the device, to measure a temperature of the coil based on voltage measurements at the three different axial locations. During operation of the actuator the one or more springs flex to accommodate axial displacements of the magnet assembly relative to the voice coil.

In some embodiments, the wearable device is a smart watch or a head-mounted display.

Among other advantages, embodiments feature voice coil actuators that can be used to deduce the temperature of the coil and of components attached to the coil with few additional components being used for the temperature measurements. While conventional temperature sensors may be too heavy and/or bulky to attach directly to a panel of the panel audio loudspeaker, for example, the described subject matter does not require additional components to be attached to the panel. Therefore, the temperature of the panel can be approximated without interfering significantly with the performance of the panel audio loudspeaker and without adding significantly to the weight of a device that includes the panel audio loudspeaker.

The temperature sensor approximates the panel temperature by measuring the resistances of the coil and portions of the coil, e.g., by measuring the voltage at the terminals attached to the coil. Therefore, while a conventional temperature sensor draws power from a power supply, the temperature sensor described herein can draw less power due to the relative simplicity of measuring the voltages at the terminals. In addition to drawing less power, the circuitry of the described temperature sensor can be less complex, and therefore cheaper to manufacture, than a conventional temperature sensor.

Other advantages will be evident from the description, drawings, and claims.

BRIEF DESCRIPTION OF THE DRAWINGS

Like reference symbols in the various drawings indicate like elements.

DETAILED DESCRIPTION

Figure 1:
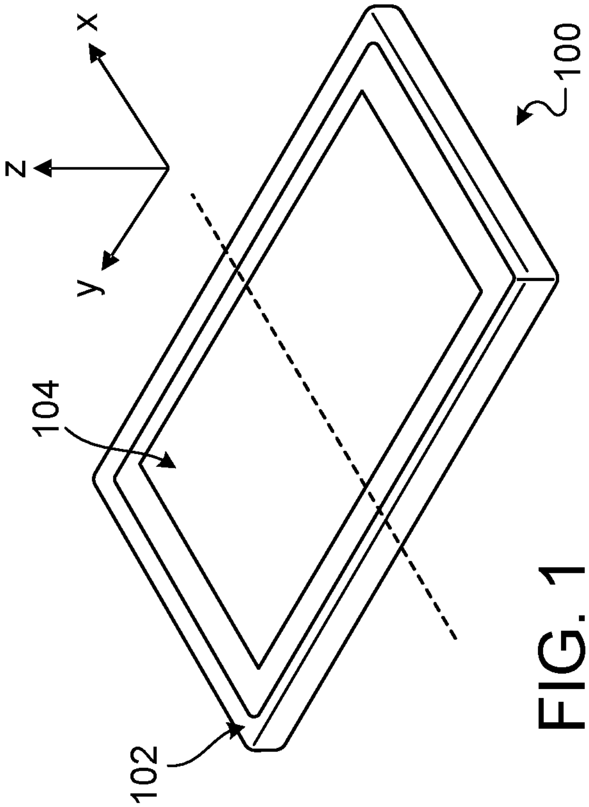
FIG. 1 is a perspective view of an embodiment of a mobile device.

In certain aspects, the disclosure features voice coil actuators for panel audio loudspeakers, such as distributed mode loudspeakers (DMLs), that include temperature sensors for monitoring the temperature of the voice coil and/or the panel or other components which may experience undesirable heating due to heating of the voice coil during operation. Such loudspeakers can be integrated into a mobile device, such as a mobile phone. For example, referring to FIG. 1, a mobile device 100 includes a device chassis 102 and a touch panel display 104 including a flat panel display (e.g., an OLED or LCD display panel) that integrates a panel audio loudspeaker. FIG. 1 also includes a Cartesian coordinate system with x, y, and z axes, for ease of reference. Mobile device 100 interfaces with a user in a variety of ways, including by displaying images and receiving touch input via touch panel display 104. Typically, a mobile device has a depth (in the z-direction) of approximately 10 mm or less, a width (in the x-direction) of 60 mm to 80 mm (e.g., 68 mm to 72 mm), and a height (in the y-direction) of 100 mm to 160 mm (e.g., 138 mm to 144 mm).

Mobile device 100 also produces audio output. The audio output is generated using a panel audio loudspeaker that creates sound by causing the flat panel display to vibrate. The display panel is coupled to an actuator, such as a distributed mode actuator, or DMA. The actuator is a movable component arranged to provide a force to a panel, such as touch panel display 104, causing the panel to vibrate. The vibrating panel generates human-audible sound waves, e.g., in the range of 20 Hz to 20 kHz.

In addition to producing sound output, mobile device 100 also produces haptic output using the actuator. For example, the haptic output can correspond to vibrations in the range of 180 Hz to 300 Hz.

Figure 2:
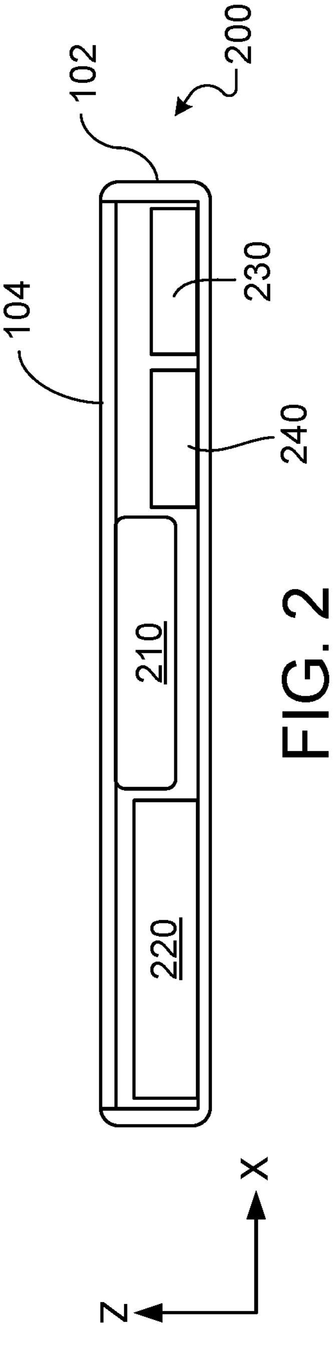
FIG. 2 is a schematic cross-sectional view of the mobile device of FIG. 1.

FIG. 1 also shows a dashed line that corresponds to the cross-sectional direction shown in FIG. 2. Referring to FIG. 2, a cross-section of mobile device 100 illustrates device chassis 102 and touch panel display 104, or simply display 104. Device chassis 102 has a depth measured along the z-direction and a width measured along the x-direction. Device chassis 102 also has a back panel, which is formed by the portion of device chassis 102 that extends primarily in the xy-plane. Mobile device 100 includes an actuator 210, which is housed behind display 104 in chassis 102 and affixed to the back side of display 104. Generally, actuator 210 is sized to fit within a volume constrained by other components housed in the chassis, including an electronic control module 220 and a battery 230. Mobile device 100 also includes a temperature sensor 240.

Figure 3A:
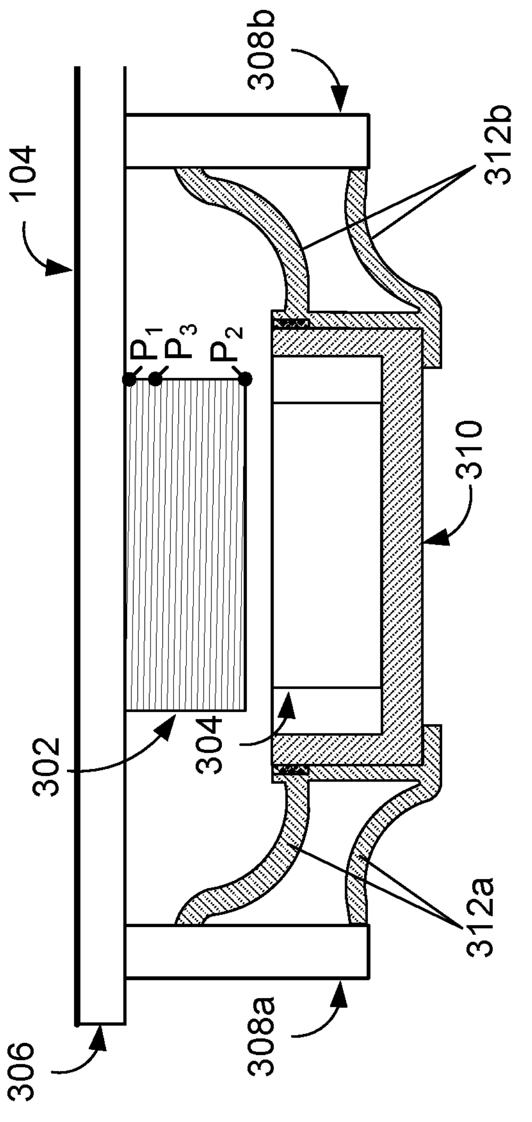
FIG. 3A is a side view of a moving magnet actuator including a voice coil, which includes three terminals.

Referring to FIG. 3A, an embodiment of an actuator 300 includes a voice coil 302, which includes three terminals. The three terminals are positioned along the axial length of voice coil 302, each at a different position labeled $P_1$, $P_2$, and $P_3$. One end of voice coil 302 is attached to a panel 306, while the opposite end of the voice coil is free.

The actuator further includes a magnet 304 that fits within a space formed by voice coil 302. The actuator further includes posts 308*a* and 308*b*, which are attached to panel 306. In this embodiment, panel 306 is attached to display 104, although in other embodiments, panel 306 can form part of display 104 and voice coil 302 and posts 308*a* and 308*b* are attached directly to the display.

The magnetic field produced by magnet 304 runs along the x-direction as it passes through coil 302. In some embodiments, a pole piece is attached to the top surface of magnet 304 to better focus the magnetic field produced by the magnet in the x-direction. Magnet 304 is attached to a cup 310, which is mechanically coupled by two elastic components, 312*a* and 312*b*, (e.g., springs) to posts 308*a* and 308*b*. Elastic components 312*a* and 312*b* connect cup 310 to posts 308*a* and 308*b*, respectively. Elastic components 312*a* and 312*b* can flex to allow magnet 304 and cup 310 to move in the z-direction, in response to coil 302 being energized, which induces a magnetic field that surrounds the coil and interacts with the magnetic field of the magnet.

Figure 3B:
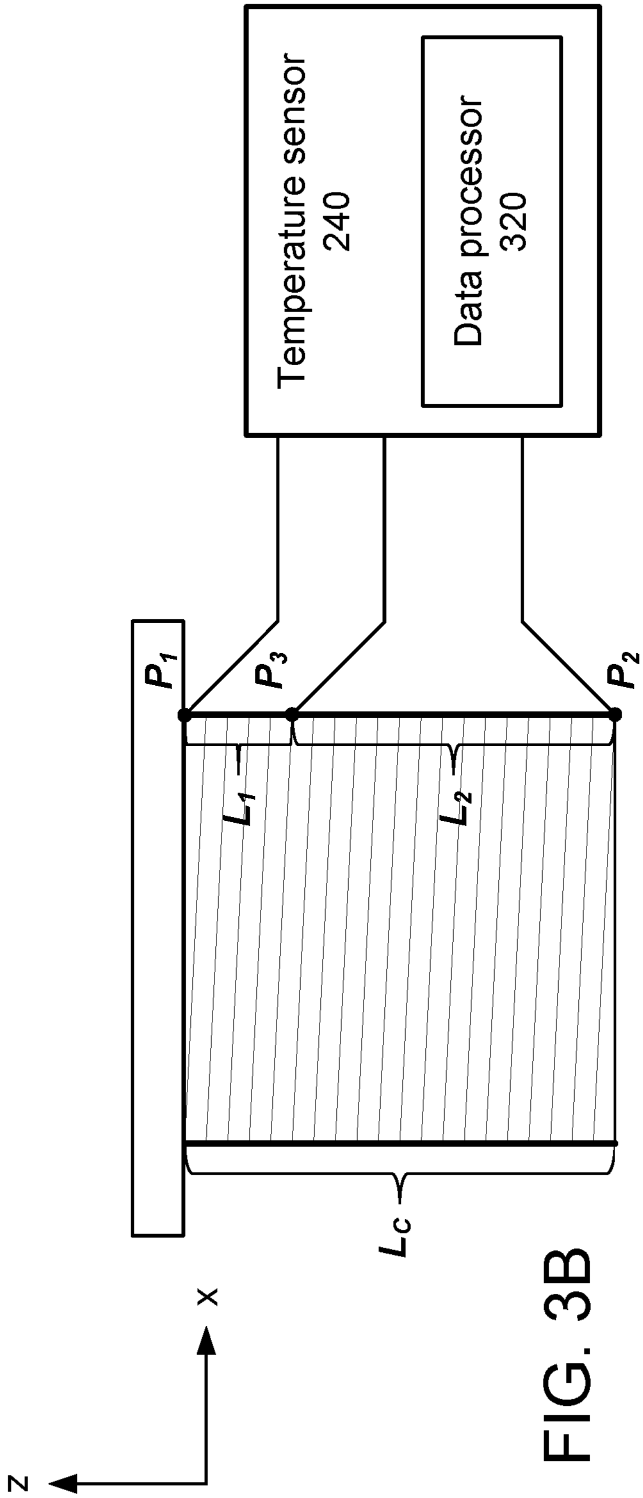
FIG. 3B is a close-up side view of the voice coil of FIG. 3A with each of the three terminals attached to a temperature sensor that includes a data processor.

Each of the three terminals at positions $P_1$, $P_2$, and $P_3$ of coil 302 are electrically coupled to a temperature sensor 240, e.g., by wires that are connected at one end to the coil and at the opposite end to the temperature sensor. FIG. 3B is a close-up side view of coil 302 with each of the three terminals attached to temperature sensor 240, which includes a data processor 320.

The three terminals at positions $P_1$, $P_2$, and $P_3$ partition coil 302 into discrete lengths. A first length that extends between $P_1$ and $P_2$ is labeled $L_1$, while a second length that extends between $P_2$, and $P_3$ is labeled $L_2$. The sum of the lengths $L_1$ and $L_2$ is equal to the total length of coil 302, which is labeled $L_2$. While FIG. 3B shows the lengths $L_1$, $L_2$, and $L_c$ as extending in the z-direction, because the coil also extends in the x and y-directions, it should be understood that the lengths $L_1$, $L_2$, and $L_c$ also include x and y-components.

In the embodiment illustrated in FIGS. 3A-3B, $L_1$ i is approximately a quarter of the total length of coil 302. That is, $L_c$, is approximately equal to $4L_1$, and P3 is positioned approximately a quarter way down from the top of coil 302. Measuring along the z-axis with respect to the coil length, $L_c$, positions $P_1$ and $P_3$ are at z=0 and z=$L_c$, respectively, while position P3 is at $$z = \frac{L_C}{4}.$$

Temperature sensor 240 can determine a voltage at each of the three terminals, relative to a common, ground terminal. Temperature sensor 240 can also determine the voltage of one of the terminals at positions $P_1$, $P_2$, and $P_3$ relative to one of the other terminals.

During the operation of actuator 300, coil 302 is energized by a current from a power supply. Knowing the magnitude of the current flowing through coil 302, and the voltage across two of the terminals of the coil, temperature sensor 240 can calculate the resistance of the length of coil between the two terminals. While the current passes through coil 302, the coil is expected to heat up. In general, as the temperature of a conductor increases, the resistivity of the conductor also increases. Therefore, temperature sensor 240 is configured to correlate the change in resistance of a length of coil 302 to a change in temperature of the length of the coil.

Because one end of coil 302 is in free air, while the opposite end is attached to panel 306, the temperatures at positions $P_1$ and $P_2$ are expected to be different. For example, because coil 302 is attached to panel 306, some of the heat of the coil is transferred to the panel. Accordingly, the temperature at position $P_1$ should be less than the temperature at position $P_2$, with a temperature gradient being formed between the two positions.

Accordingly, it is expected that the temperature of coil 302 at position $P_2$ be approximately the same as the temperature of panel 306 at the portion of the panel that is attached to the coil. It is particularly useful to approximate the temperature of coil 302 at position $P_1$, as this temperature is likely to be the same as the temperature of the portion of display 104 that is in contact with the coil.

Panel 306 can include an electronic display panel or can be attached to an electronic display panel, such as an OLED display, which may be sensitive to heat. Because coil 302 transfers some of its heat to panel 306, it is useful to monitor the temperature of the coil to prevent the panel from reaching temperatures that would damage the electronic display panel.

A first-order approximation of the coil temperature can be made by measuring the initial resistance of the length $L_c$ when the coil is not energized, measuring the resistance of the length $L_c$ when the coil is energized, and using these resistance measurements to determine a change in resistance of the length $L_c$. For example, temperature sensor 240 can measure the voltages at positions $P_1$ and $P_2$, and therefore, the voltage drop across the length $L_c$. Using the voltage drop across $L_c$, temperature sensor 240 can determine the resistance of length $L_c$, and using the change in resistance of $L_c$, data processor 320 can approximate the change in temperature of coil 302.

The first-order approximation of the coil temperature can be used to determine a first-order approximation of the display temperature. For example, the relationship between the change in coil temperature and the change in display temperature can be found experimentally, and the equation relating the two can be programmed into data processor 320, as described in greater detail below with respect to FIG. 4. In this way, a coil having terminals at each end allows temperature sensor 240 to determine the change in resistance across the length of the coil, while data processor 320 can correlate the change in resistance to a change in the temperature of display 104 using an experimentally-derived equation.

More specifically, when the change in temperature of a coil is determined using terminals at the two endpoints of the coil, the approximation determines the change in temperature of the midpoint of the coil. Because the equation derived experimentally using two-terminals does not account for the gradient across the coil, the approximation of the change in display temperature using the two-terminal equation will be of limited use.

A coil that includes an additional terminal positioned between the two ends of the coil allows a temperature sensor to measure the resistance across portions of the coil. Measuring the resistance across multiple portions of the coil allows for the coil temperature to be approximated at multiple points along the coil. Therefore, the additional terminal can allow temperature sensor 240 to account for the temperature gradient across coil 302, which improves the approximation of the change in display temperature compared to the two-terminal approximation.

By measuring the voltages at positions $P_1$ and $P_3$, temperature sensor 240 can determine the resistance across the length of coil $L_1$. Similarly, temperature sensor 240 can determine the resistance across the length of coil $L_2$. Using the change in the resistances of the lengths $L_1$ and $L_2$ from when coil 302 is at room temperature to when the coil temperature has increased as a result of being energized, temperature sensor 240 can approximate the change in temperatures of the lengths $L_1$ and $L_2$.

More specifically, the temperature measurement across $L_1$ approximates the temperature of the coil at the midpoint between positions $P_1$ and $P_3$. In the embodiment shown in FIGS. 3A and 3B, $P_3$ is positioned approximately a quarter of the coil length down from panel 306; therefore, while position $P_1$ is at z=0 and position $P_3$ is at position $$z = \frac{L_C}{4},$$

the midpoint between positions $P_1$ and $P_3$, at which the temperature measurement across $L_1$ is approximated, is at $$z = \frac{L_C}{8}.$$

Just as the temperature measurement across $L_1$ approximates the coil temperature at a midpoint between positions $P_1$ and $P_3$, the temperature measurement across $L_2$ approximates the coil temperature at the midpoint between positions $P_2$ and $P_3$. The midpoint between these two points, at which the temperature measurement across $L_2$ is approximated, is at $$z = \frac{5L_C}{8}.$$

Approximating the change in coil temperature of lengths $L_1$, $L_2$, and $L_c$ yields three measurements at different axial locations along coil 302. Using these three measurements, allows temperature sensor 240 to improve upon the first-order approximation described above by accounting for the temperature gradient formed across coil 302. For example, the relationship between the change in coil temperature at each of the three points, $$z = \frac{L_C}{8}, \frac{L_C}{2}, \text{ and } \frac{5L_C}{8},$$

and the change in display temperature can be found experimentally.

After determining an equation relating the changes in coil temperature to the change in panel temperature, the equation can be programmed into data processor 320. For example, an equation can be derived by measuring the change in resistance across various portions of the coil as a function of the length of those portions. For each of the different lengths that are sampled, an accompanying display temperature measurement is made. These data points are used to plot the resistance versus tap location and the panel temperature versus tap location. An example of such a plot is shown with respect to FIG. 4.

Figure 4:
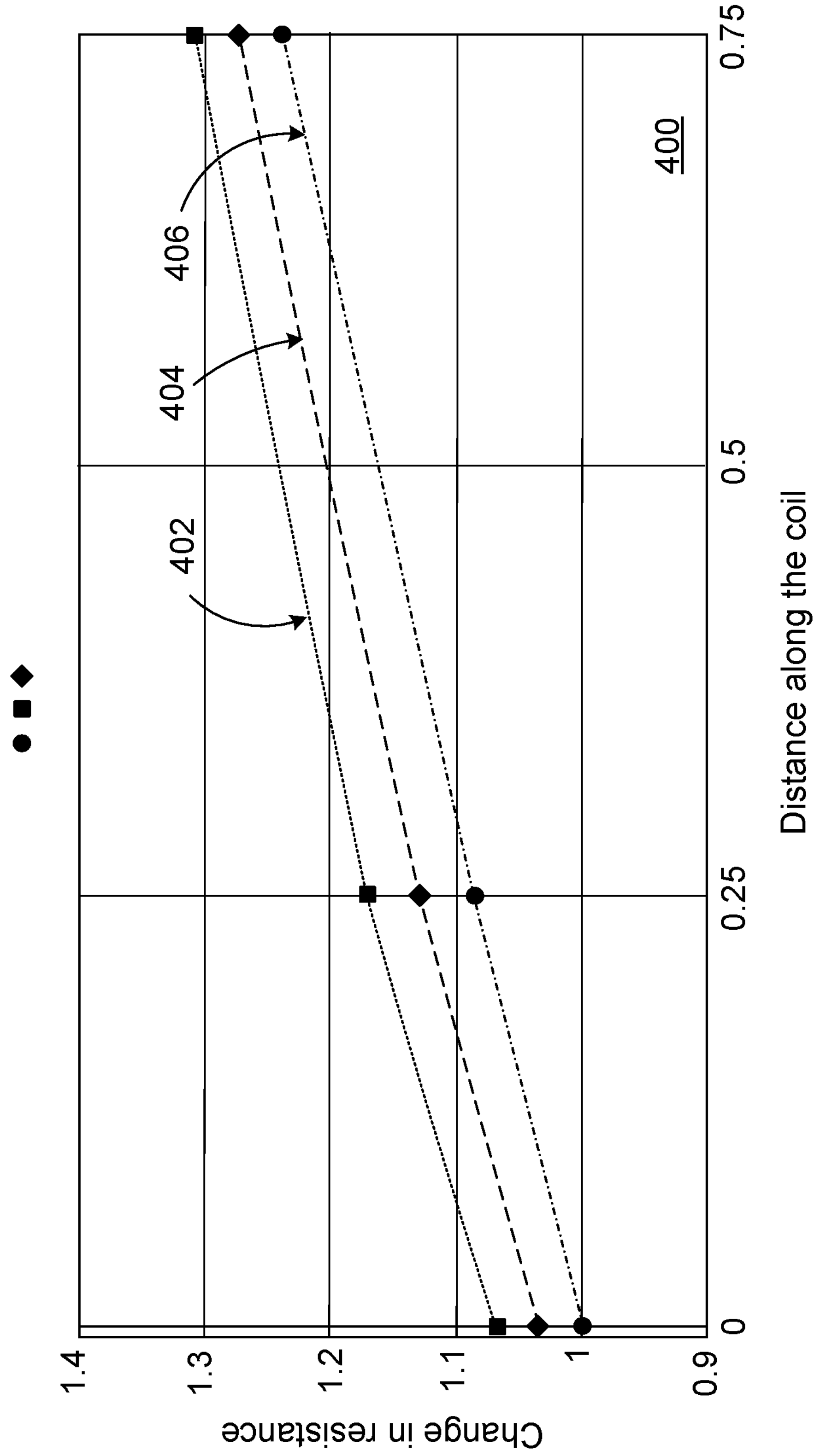
FIG. 4 is a plot showing a resistance curve generated by the data processor of FIG. 3B.

FIG. 4 is a plot 400 showing a resistance curve generated by a data processor, e.g., data processor 320. Plot 400 can be used to generate an experimentally-derived equation that correlates the change in resistance across portions of coil 302 to a change in temperature of display 104. The x-axis is unitless and shows the location of a test terminal as a fraction of the coil length, $L_c$. That is, at x=0, the test terminal is located at position $P_1$, while at x=0.25 the test terminal is located at position $P_3$. Although the position of the terminals does not change during the operation of the actuator, the location of the test terminal is changed experimentally to generate plot 400.

The y-axis is also unitless and shows the change in resistance of portions of the coil. For example, calling $R_1$ the resistance across $L_1$ when coil 302 is not energized and $R_1$' the resistance across $L_1$ when the coil is energized, then the change in the resistance across $L_1$ is $\Delta R_1=R_1'/R_1$. Similarly, if $R_2$ is the resistance across $L_2$ when the coil is not energized and $R_2$' is the resistance across $L_2$ when the coil is energized, then the change in the resistance across $L_2$ is $\Delta R_2=R_2'/R_2$. Plot 400 shows $\Delta R_1$ and $\Delta R_2$ with respect to the tap location. Curves 404 and 406 corresponds to $\Delta R_1$ and $\Delta R_2$, respectively.

Plot 400 also shows the change in display temperature, ΔT, in relation to $\Delta R_1$ and $\Delta R_2$. Any suitable method can be used to determine the change in temperature. In general, a temperature sensor is used to measure the initial display temperature, T, at position $P_1$ when the coil is not energized. After the coil has been energized, the temperature sensor can measure the temperature of the display again to determine another temperature measurement, T' and ΔT is the quotient T'/T. Curve 402 corresponds to ΔT.

Plot 400 shows that a linear relationship exists between $\Delta R_1$,$\Delta R_2$, and ΔT. This relationship can be programmed into data processor 320 and used to determine the change in display temperature after the coil has been energized. While plot 400 shows a linear relationship between $\Delta R_1$,$\Delta R_2$, and ΔT the relationship can have other functional forms. For example, the relationship may be linear when coil 302 has been energized for a relatively long time (e.g., 10s of seconds or over a minute), but when the coil has not been energized for a long time, the relationship between $\Delta R_1$,$\Delta R_2$, and ΔT may be quadratic.

Figure 5A:
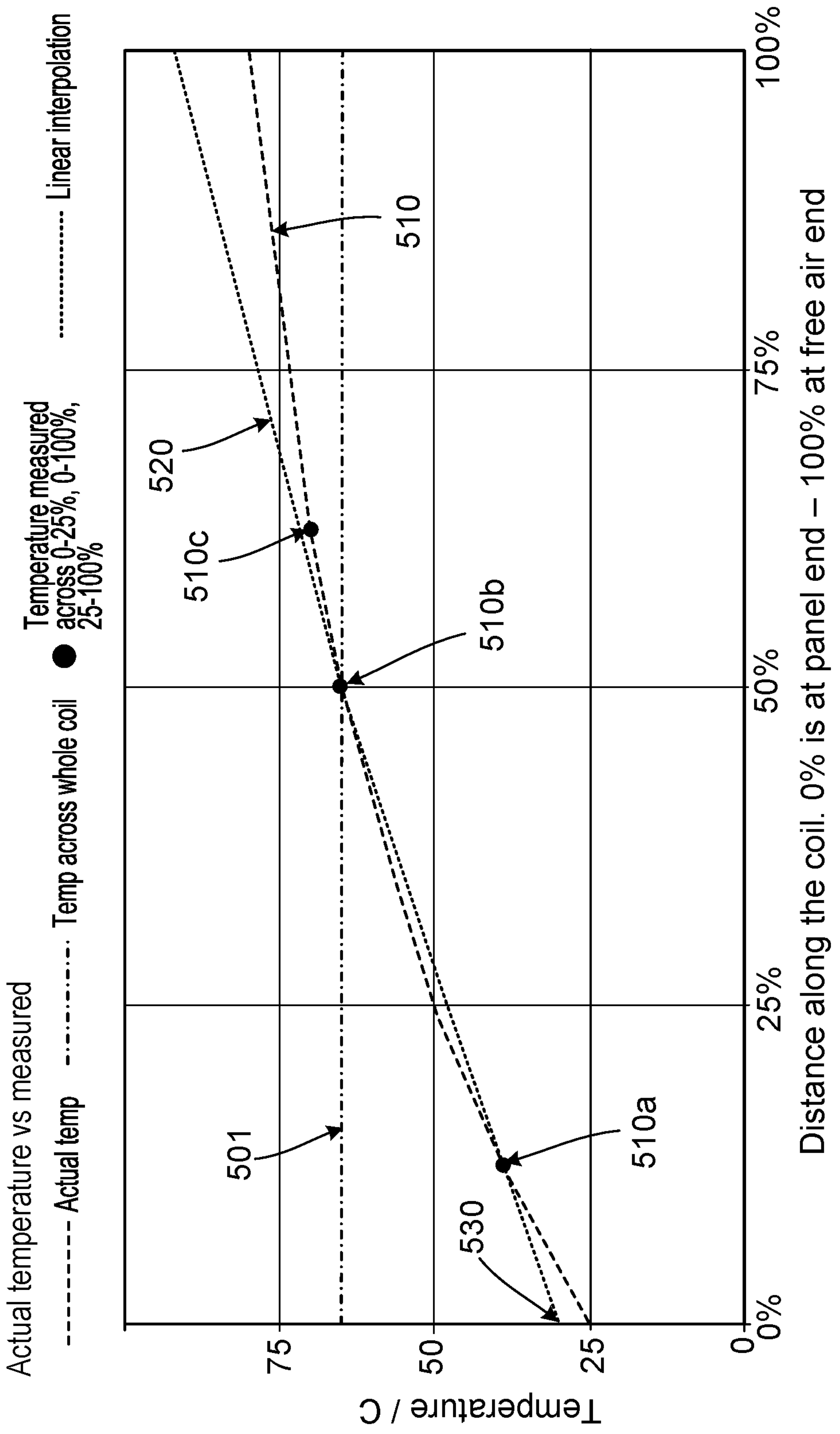
FIGS. 5A and 5B are plots showing temperature measurements correlated to different positions along the length of the coil and illustrating methods for determining the temperature at one end of the coil based on those temperature measurements.

In some embodiments, the temperature at the display can be determined as follows. Referring to FIG. 5A, the resistance measurements across the three terminals yield three temperatures at different points along the coil. A first measurement is made across terminals at the display panel and another 25% down the length of the coil from the display panel. This resistance is correlated to a temperature 12.5% down the length of the coil, at point 510*a*. A second measurement is made across the terminal at the display panel and a second terminal at the opposite end of the coil (at 100%). This is correlated to a temperature 50% down the length of the coil, at point 510*b*. The third measurement is made between the terminal 25% down the coil at the terminal 100% down the length of the coil. This correlates to a temperature 62.5% down the length of the coil, at point 510*c*. A quadratic curve fitted to these points is shown as line 510. The horizontal line 501 shows the temperature that would be recorded if only the resistance across the whole coil is measured, i.e., the temperature at 510*b*. Using a linear interpolation between 0-100% and 0-25%, the temperature at the panel can be predicted by where the line 520 crosses the axis, at point 530.

Figure 5B:
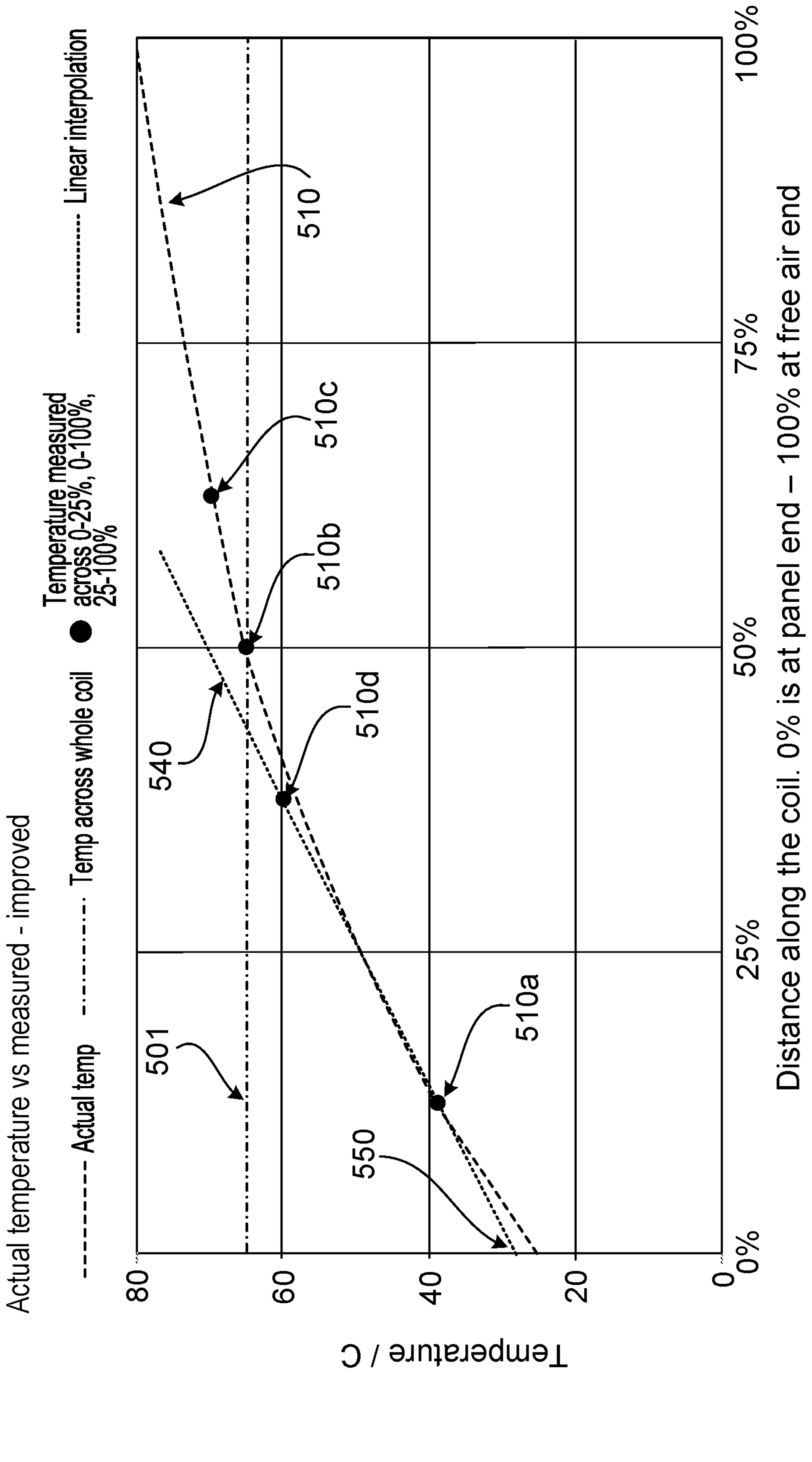

Referring to FIG. 5B, in some implementations, an exponential curve of the real temperature is approximated by using all three temperatures measured. In this method, a fourth point is created from the 0-100% and 25-100% points by reflecting the 25-100% point across the 0-100% point, providing a fourth point 510*d*. A linear interpolation between points 510*a* and 510*d*, line 540, can be used to predict the 0 crossing point 550, the display temperature.

In general, other mathematical methods can be used to predict the panel temperature from the three terminal measurements.

In some implementations, data processor 320 can account for the duration of time that coil 302 has been energized and choose a relationship between resistance and temperature according to the duration. For example, when the coil goes from an unenergized state to an energized state, data processor 320 can determine the change in display temperature using a quadratic relationship. Upon reaching a certain threshold time the data processor 320 can choose an equation with a different functional form.

By monitoring the change in the temperature of display 104, temperature sensor 240 can approximate the change in display temperature and prevent the display temperature from reaching a critical value that may result in the display being damaged.

To prevent heat damage to display 104, device 100 can be configured to change one or more settings of the device based on the estimated temperature of the display. For example, if the estimated temperature reaches or exceeds a threshold temperature, device 100 can change (e.g., lower) the brightness of the electronic display and/or change (e.g., lower) the volume of audio output by the device.

Not only is it useful to estimate the temperature of panel 306, it is also useful to estimate the coil temperature at each of multiple points along the coil. While temperature sensor 240 can approximate the temperature at each of three locations along coil 302, that is, at $$z = \frac{L_C}{8}, \frac{L_C}{2}, \text{ and } \frac{5L_C}{8},$$

in some situations it is useful to approximate the temperature at other points along the coil. For example, estimating the temperature at the free end of coil 302, $z = L_c$, can be useful if the free end of the coil is close to or connected to a heat-sensitive component of device 100. The temperature at other portions of coil 302 may be of interest for similar reasons.

Just as an equation relating the changes in coil temperature to the change in panel temperature can be derived and programmed into data processor 320, the changes in temperature of the three points along coil 302 can be used to derive the temperature at another point along the coil. In this way, data processor 320 can approximate temperature of coil 302 at points other than the three described above.

In some implementations, the positions of the three terminals can be different from the positions $P_1$, $P_2$, and $P_3$, shown in FIG. 3B. For example, like coil 302, a coil of length $L_c$ can include terminals at both ends of the coil, but instead of having a terminal positioned at $P_3$, i.e., $$z = \frac{L_C}{4},$$

the third terminal of the coil can be at a position $P_3'$ located at $$z = \frac{3L_C}{4}.$$

Having a terminal at position $P_3'$ allows temperature sensor 240 to approximate the temperature of the bottom quarter of the coil, which is farthest from the connection to panel 306. A temperature sensor connected to a coil having a third terminal at position $P_3'$ can be used to more accurately approximate the temperature of the coil at $z = L_c$, compared to temperature sensor 240 that is connected to coil 302.

Temperature sensor 240 can measure the temperature of coil 302 at the audio frequency of the coil, which is the frequency of the signal that is used to energize the coil. The audio frequency of the coil may be relatively high, e.g., upwards of 40 kHz. In general, the temperature of coil 302 may change more quickly than does the temperature of display 104. Therefore, while temperature sensor 240 may measure the temperature of coil 302 at the audio frequency of the coil, the temperature sensor may measure the temperature of display 104 at a lower frequency.

Figure 6:
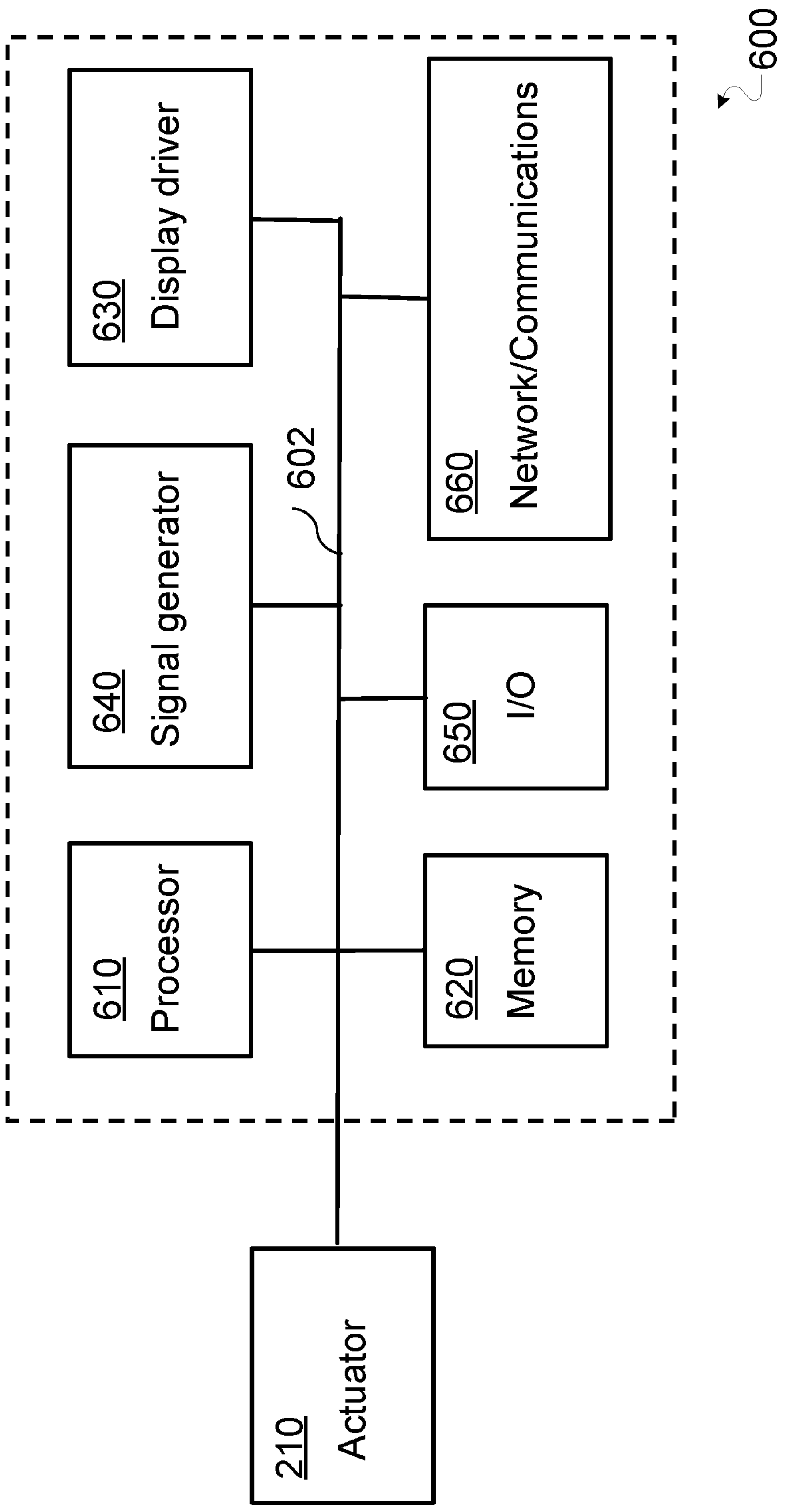
FIG. 6 is a schematic diagram of an embodiment of an electronic control module for a mobile device.

In general, the disclosed actuators are controlled by an electronic control module, e.g., electronic control module 220 in FIG. 2 above. In general, electronic control modules are composed of one or more electronic components that receive input from one or more sensors and/or signal receivers of the mobile phone, process the input, and generate and deliver signal waveforms that cause actuator 210 to provide a suitable haptic response. Referring to FIG. 6, an exemplary electronic control module 600 of a mobile device, such as mobile phone 100, includes a processor 610, memory 620, a display driver 630, a signal generator 640, an input/output (I/O) module 650, and a network/communications module 660. These components are in electrical communication with one another (e.g., via a signal bus 602) and with actuator 210.

Processor 610 may be implemented as any electronic device capable of processing, receiving, or transmitting data or instructions. For example, processor 610 can be a microprocessor, a central processing unit (CPU), an application-specific integrated circuit (ASIC), a digital signal processor (DSP), or combinations of such devices.

Memory 620 has various instructions, computer programs or other data stored thereon. The instructions or computer programs may be configured to perform one or more of the operations or functions described with respect to the mobile device. For example, the instructions may be configured to control or coordinate the operation of the device's display via display driver 630, signal generator 640, one or more components of I/O module 650, one or more communication channels accessible via network/communications module 660, one or more sensors (e.g., biometric sensors, temperature sensors, accelerometers, optical sensors, barometric sensors, moisture sensors and so on), and/or actuator 210.

Signal generator 640 is configured to produce AC waveforms of varying amplitudes, frequency, and/or pulse profiles suitable for actuator 210 and producing acoustic and/or haptic responses via the actuator. Although depicted as a separate component, in some embodiments, signal generator 640 can be part of processor 610. In some embodiments, signal generator 640 can include an amplifier, e.g., as an integral or separate component thereof.

Memory 620 can store electronic data that can be used by the mobile device. For example, memory 620 can store electrical data or content such as, for example, audio and video files, documents and applications, device settings and user preferences, timing and control signals or data for the various modules, data structures or databases, and so on. Memory 620 may also store instructions for recreating the various types of waveforms that may be used by signal generator 640 to generate signals for actuator 210. Memory 620 may be any type of memory such as, for example, random access memory, read-only memory, Flash memory, removable memory, or other types of storage elements, or combinations of such devices.

As briefly discussed above, electronic control module 600 may include various input and output components represented in FIG. 6 as I/O module 650. Although the components of I/O module 650 are represented as a single item in FIG. 6, the mobile device may include a number of different input components, including buttons, microphones, switches, and dials for accepting user input. In some embodiments, the components of I/O module 650 may include one or more touch sensor and/or force sensors. For example, the mobile device's display may include one or more touch sensors and/or one or more force sensors that enable a user to provide input to the mobile device.

Each of the components of I/O module 650 may include specialized circuitry for generating signals or data. In some cases, the components may produce or provide feedback for application-specific input that corresponds to a prompt or user interface object presented on the display.

As noted above, network/communications module 660 includes one or more communication channels. These communication channels can include one or more wireless interfaces that provide communications between processor 610 and an external device or other electronic device. In general, the communication channels may be configured to transmit and receive data and/or signals that may be interpreted by instructions executed on processor 610. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, one or more of the communication channels of network/communications module 560 may include a wireless communication channel between the mobile device and another device, such as another mobile phone, tablet, computer, or the like. In some cases, output, audio output, haptic output or visual display elements may be transmitted directly to the other device for output. For example, an audible alert or visual warning may be transmitted from the electronic device 100 to a mobile phone for output on that device and vice versa. Similarly, the network/communications module 660 may be configured to receive input provided on another device to control the mobile device. For example, an audible alert, visual notification, or haptic alert (or instructions therefore) may be transmitted from the external device to the mobile device for presentation.

The actuator technology disclosed herein can be used in panel audio systems, e.g., designed to provide acoustic and/or haptic feedback. The panel may be a display system, for example based on OLED of LCD technology. The panel may be part of a smartphone, tablet computer, or wearable devices (e.g., smartwatch or head-mounted device, such as smart glasses).

Other embodiments are in the following claims.

What is claimed is:

1. A device comprising:
- a panel audio loudspeaker comprising a panel extending in a plane and an actuator coupled to the panel, the actuator comprising:
  - a voice coil attached to and extending from the panel along an axis;
  - a magnet assembly suspended from the panel via one or more springs; and
  - a temperature sensor in electrical contact with the coil at three different axial locations, the temperature sensor being configured, during operation of the device, to measure a temperature of the coil based on voltage measurements at the three different axial locations.

2. The device of claim 1, wherein the panel comprises an OLED display.

3. The device of claim 1, wherein the three different axial locations comprises:
- a first location positioned at a first end of the voice coil attached to the panel,
- a second location positioned at a second end of the voice coil opposite the first end, and
- a third location positioned between the first and second locations.

4. The device of claim 3, wherein the third location is positioned closer to the first location than to the second location.

5. The device of claim 3, wherein the temperature sensor comprises one or more data processors programmed to measure the temperature of the coil by determining an electrical resistance of each of one or more portions of the voice coil based on the voltage measurements.

6. The device of claim 5, wherein the one or more data processors are further configured to generate a temperature measurement for each of three portions of the voice coil, the three portions of the voice coil including a first portion that extends from the first to the third location, a second portion that extends from the second to the third location, and a third portion that extends from the first to the second location.

7. The device of claim 5, wherein the one or more data processors are further configured to correlate the electrical resistance of each of the one or more portions of the voice coil to a temperature measurement of a corresponding portion of the voice coil.

8. The device of claim 5, wherein the one or more data processors are further configured to generate a temperature curve using the resistance measurements for each of the three portions of the voice coil.

9. The device of claim 5, wherein the one or more data processors are further programmed to estimate a temperature of the panel based on the temperature of the coil.

10. The device of claim 9, wherein the device is configured to change one or more settings of the device based on the estimated temperature of the panel.

11. The device of claim 10, wherein the one or more settings comprises a brightness of the display and a volume of audio output by the device.

12. A mobile device comprising:
- an electronic display panel extending in a plane;
- a chassis attached to the electronic display panel and defining a space between a back panel of the chassis and the electronic display panel;

an electronic control module housed in the space, the electronic control module comprising a processor;

a panel audio loudspeaker comprising an actuator coupled to the display panel, the actuator comprising:

a voice coil attached to and extending from the panel along an axis; and a magnet assembly suspended from the panel via one or more springs; and a temperature sensor in electrical contact with the coil at three different axial locations, the temperature sensor being configured, during operation of the device, to measure a temperature of the coil based on voltage measurements at the three different axial locations; and wherein during operation of the actuator the one or more springs flex to accommodate axial displacements of the magnet assembly relative to the voice coil.

13. The mobile device of claim 12, wherein the mobile device is a smartphone or tablet computer.

14. A wearable device comprising:

an electronic display panel extending in a plane;

a chassis attached to the electronic display panel and defining a space between a back panel of the chassis and the electronic display panel;

an electronic control module housed in the space, the electronic control module comprising a processor;

a panel audio loudspeaker comprising an actuator coupled to the display panel, the actuator comprising:

a voice coil attached to and extending from the panel along an axis; and a magnet assembly suspended from the panel via one or more springs; and a temperature sensor in electrical contact with the coil at three different axial locations, the temperature sensor being configured, during operation of the device, to measure a temperature of the coil based on voltage measurements at the three different axial locations; and wherein during operation of the actuator the one or more springs flex to accommodate axial displacements of the magnet assembly relative to the voice coil.

15. The wearable device of claim 14, wherein the wearable device is a smart watch or a head-mounted display.

* * * * *